(12) United States Patent
Nagarathnam et al.

(10) Patent No.: US 6,702,408 B1
(45) Date of Patent: *Mar. 9, 2004

(54) SINGLE PLATE HYDRODYNAMIC BEARING CARTRIDGE

(75) Inventors: Lakshman Nagarathnam, Capitola, CA (US); Hans Leuthold, Santa Cruz, CA (US); David Jennings, Santa Cruz, CA (US); Norbert Parsoneault, Watsonville, CA (US); Wesley R. Clark, Watsonville, CA (US); Gunther Heine, Aptos, CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,373

(22) Filed: Nov. 21, 1997

Related U.S. Application Data

(63) Continuation of application No. 08/546,932, filed on Oct. 23, 1995, now abandoned, which is a continuation-in-part of application No. 08/278,754, filed on Jul. 22, 1994, now Pat. No. 5,487,608.

(51) Int. Cl.$^7$ ................................................ F16C 17/10
(52) U.S. Cl. ...................................................... 384/112
(58) Field of Search ................................ 384/112, 113, 384/115, 123, 121

(56) References Cited

U.S. PATENT DOCUMENTS

| | | | | |
|---|---|---|---|---|
| 4,892,418 A | * | 1/1990 | Asada et al. ................. | 384/112 |
| 5,433,529 A | * | 7/1995 | Hensel ........................ | 384/112 |
| 5,516,212 A | * | 5/1996 | Titcomb ...................... | 384/112 |

* cited by examiner

*Primary Examiner*—Lenard A. Footland
(74) *Attorney, Agent, or Firm*—Moser, Patterson & Sheridan LLP

(57) ABSTRACT

Hydrodynamic bearing having a shaft relatively rotatable with respect to a surrounding sleeve and having a thrust plate on one end thereof rotating in a recess of the sleeve. The shaft is preferably interrupted by a equi-pressure groove accessing a central reservoir in the shaft and having journal bearings defined by herringbone patterns above and below the groove to stabilize and provide stiffness to the cartridge. The stiffness of the cartridge is further enhanced by a thrust plate carried at one end of the shaft and rotating in a recess of the sleeve and being used to define thrust bearings on either surface thereof.

9 Claims, 4 Drawing Sheets

SINGLE PLATE HYDRODYNAMIC BEARING CARTRIDGE

RELATED APPLICATIONS

This is a continuation of application Ser. No. 08/546,932 filed Oct. 23, 1995 now abandoned, which is a continuation-in-part of Ser. No. 08/278,754 filed Jul. 22, 1994, now U.S. Pat. No. 5,487,608.

This application is related to and may be used in common with the invention disclosed in "Vacuum Fill Technique for Hydrodynamic Bearing", U.S. Ser. No. 08/503,568, filed Jul. 18, 1995, U.S. Pat. No. 5,601,125; inventor: Parsoneault; "Single Plate Hydrodynamic Bearing with Fluid Circulation Path and Self Balancing Fluid Level", U.S. Ser. No. 08/278,754, filed Jul. 22, 1994, U.S. Pat. No. 5,487,608, inventor: Leuthold, all of said applications being assigned to the assignee of the present invention and incorporated herein by reference.

FIELD OF THE INVENTION

The present invention relates to the field of hydrodynamic bearing assemblies, and especially to such assemblies adapted to have good stiffness and long useful life.

BACKGROUND OF THE INVENTION

Many motors, spindles and the like are based on bearing cartridges comprising a shaft and sleeve and bearings supporting these two elements for relative rotation. For example, a shaft may be mounted by means of two ball bearings to a sleeve rotating around the shaft. One of the bearings is typically located at each end of the shaft/sleeve combination. These bearings allow for rotational movement between the shaft and the hub while maintaining accurate alignment of the sleeve to the shaft. The bearings themselves are normally lubricated by grease or oil.

The conventional bearing system described above is prone, however, to several shortcomings. First is the problem of vibration generated by the balls rolling on the raceways. Ball bearings in such cartridges frequently run under conditions that result in physical contact between raceways and balls; this occurs in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating element. This vibration results in misalignment between whatever device is supported for rotation and the surrounding environment. This source of vibration limits therefore the accuracy and the overall performance of the system incorporating the cartridge.

Another problem is related to damage caused by shocks and rough handling. Shocks create relative acceleration between stationary and rotating parts of a system which in turn shows up as a force across the bearing system. Since the contact surfaces in ball bearings are very small, the resulting contact pressures may exceed the yield strength of the bearing material and leave permanent deformation and damage on raceways and balls, which would also result in tilt, wobble, or unbalanced operation of the bearing.

Moreover, mechanical bearings are not always scalable to smaller dimensions. This is a significant drawback since the tendency in the high technology industry has been to continually shrink the physical dimensions.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferromagnetic fluids, or even air have been utilized for use in hydrodynamic bearing systems. Such bearings scale well to small sizes without being prone to many of the defects of ball bearings outlined above. Because of the lack of metal-to-metal contact, the bearing has a long life. Because of the stiffness of the bearing, it is highly stable and useful as a reference in devices such as optical encoders and the like.

However, it is apparent that a difficulty with such a hydrodynamic bearing design is their sensitivity both to machining tolerances and the temperature ranges across which they are utilized. Both of these issues are critical in hydrodynamic bearings, because the very narrow gaps between the rotating and stationary parts must be maintained so that the fluid is effective in lubricating the bearing surfaces. Further, the tolerances between the surfaces of the bearing must be very fine so that no tilting or misalignment between the two parts occurs. In other words, it is important to have a very stiff bearing which does not allow for any tilting of the rotating part relative to the stationary part. A further difficulty with prior art designs is that frequently voids or gas bubbles occur in the bearing area, thereby reducing the effective bearing surface and the related load capacity.

Thus it is clear that a number of considerations must be balanced in designing an effective hydrodynamic bearing cartridge, regardless of the area in which it will eventually be utilized.

SUMMARY OF THE INVENTION

It is therefore a primary objective of the present invention to provide a hydrodynamic bearing which is simple in design, and highly adaptable and scalable for use in many different environments. It is a further objective of the invention to provide a hydrodynamic bearing having a reliable, repeatable design so that the bearing has the necessary stiffness to be used in applications which have no tolerance for tilt, wobble, or other inaccuracies.

It is a further and related objective of the present invention to provide a hydrodynamic bearing in which the fluid circulation is controlled and directed so that the wear and tear on the two prior surfaces defining the bearing is minimized.

Another related objective of the present invention is to provide for fluid circulation within the hydrodynamic bearing such that the possibility of voids within the lubricant is minimized.

A related objective of the invention is to provide a hydrodynamic bearing design having optimized boundary conditions between the various sections of the bearings to optimize fluid flow and diminish sensitivity to temperature and machining tolerances, thereby providing a greater consistency in the dynamic performance of the invention.

These and other objectives are achieved by providing a hydrodynamic bearing having a shaft relatively rotatable with respect to a surrounding sleeve and having a thrust plate on one end thereof rotating in a recess of the sleeve. The shaft is preferably interrupted by a equi-pressure groove accessing a central reservoir in the shaft and having journal bearings defined by herringbone patterns above and below the groove to stabilize and provide stiffness to the cartridge.

The stiffness of the cartridge is further enhanced by a thrust plate carried at one end of the shaft and rotating in a recess of the sleeve and being used to define thrust bearings on either surface thereof. In a typical embodiment, chevron patterns may be coined or etched on both surfaces of the thrust plate so that appropriate pressure patterns can be set up between the thrust plate surface and either a shoulder of the sleeve or a facing counterplate. Alternatively, a counterplate may be provided in which the chevron pattern is stamped thereon, and may in a preferred embodiment even extend beyond the edges of the thrust plate and the recess in which it rotates so that disturbances to the pressure patterns are minimized.

BRIEF DESCRIPTION OF THE DRAWINGS

The features and advantages of the present invention will be better understood by reference to the following drawings wherein.

DETAILED DESCRIPTION OF A PREFERRED EMBODIMENT

Figure 1:
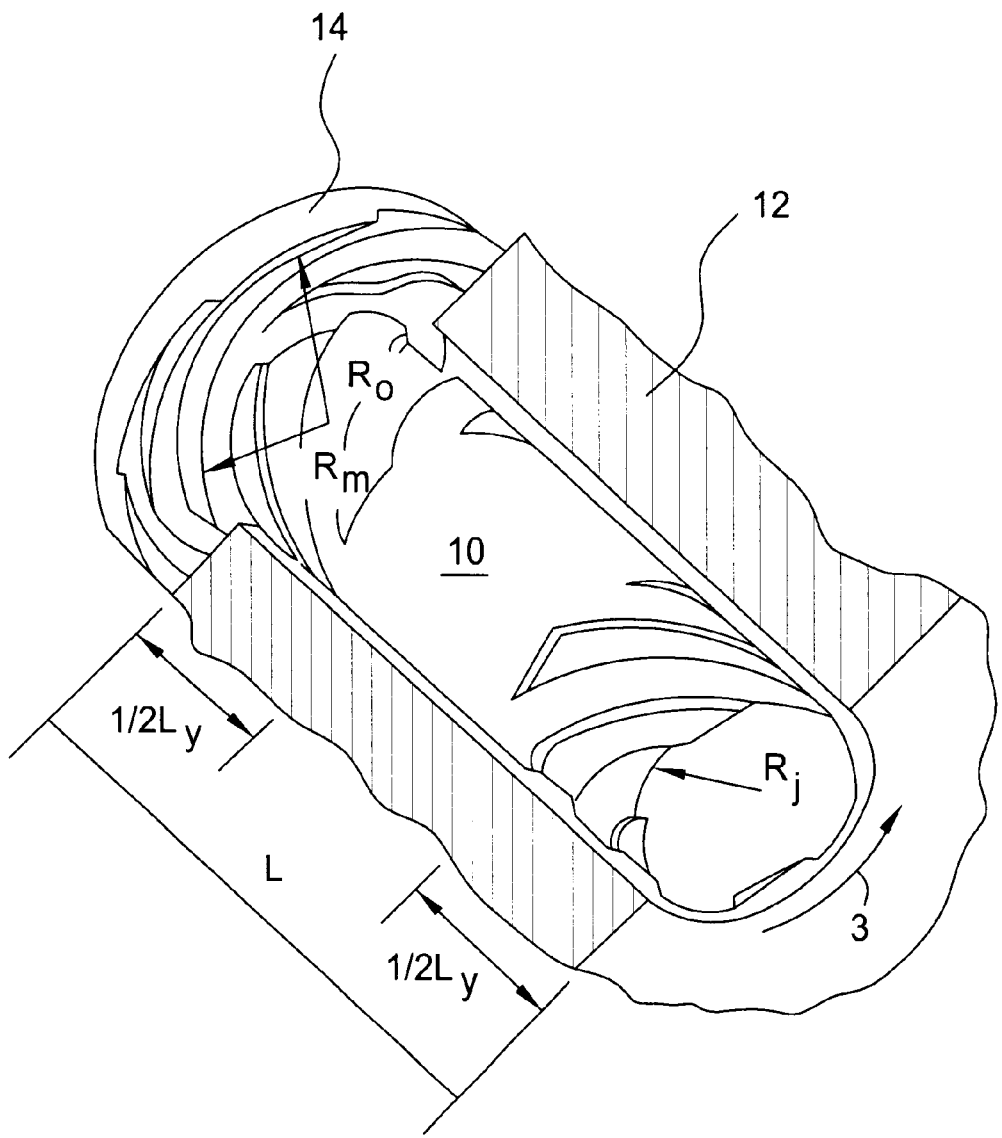
FIG. 1 is a figure used to illustrate the basic operating principles of a hydrodynamic bearing.

The basic principles of the present invention are derived from hydrodynamic bearings as already known in the technology, an example of which is shown in FIG. 1. As shown in this figure, a journal bearing includes a shaft 10 which is rotating relative to a bushing or a sleeve 12, with one of the opposing two surfaces (in this case the shaft closed) carrying cylindrical sections of spiral grooves. A thrust plate 14 may also be provided at or near one end of the shaft 10 carrying concentric spiral groove sections either on the plate itself or on the sleeve surface that it faces. Relative rotation of the shaft churns and pumps the fluid as a function of the direction, width, and angle of the grooves with respect to the sense of rotation. The pumping action builds up multiple pressure zones along the journal and the thrust plates, maintaining a fluid film between the rotating parts and providing the desired stiffness for the bearing.

Figure 2:
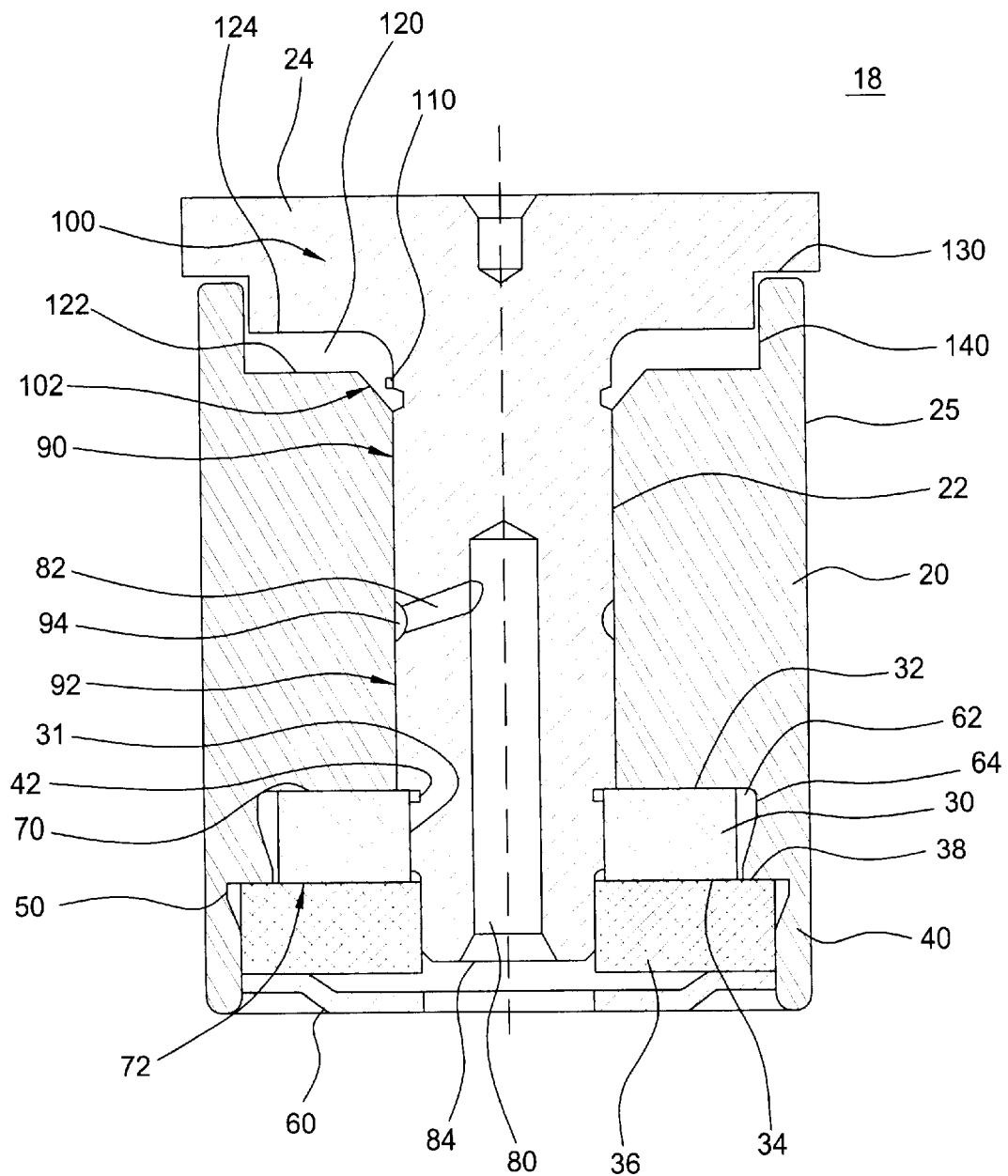
FIG. 2 is a vertical sectional view of a bearing cartridge in accordance with the present invention utilizing a rotating shaft.

FIG. 2 is a first example of a hydrodynamic bearing incorporating the principles of the present invention. The basic elements of the hydrodynamic bearing include a sleeve 20 which is preferably a single solid stationary piece which on its interior surface 22 defines the outer circular surface of the journal bearing formed by this circular, stationary sleeve and the rotating shaft 24 which rotates inside this sleeve 20. In this exemplary embodiment of a hydrodynamic bearing cartridge, the sleeve 20 is preferably a single solid piece whose outside surface will form the outer shell 25 of the overall cartridge 18.

At the lower end of the shaft 24 near its base end, a thrust plate 30 is stepped into the shaft. This thrust plate 30 extends into a recess defined in this particular embodiment by a lower horizontal surface 32 of the sleeve 20 and an upper surface 34 of a counterplate 36. In this embodiment the counterplate 36 is shown as an element separate from the sleeve 20, pressed in place against a step 38 and inside a shoulder 40 of the sleeve. Other approaches to the assembly for defining this recess are also available and within the scope of the invention. The thrust plate 30 is stepped into the recess 31 of the shaft 24, taking advantage of a small indentation 42 in the shaft 24 which allows the thrust plate to be more easily pressed into place. A small recess 50 is also provided in the sleeve 24 at the top of the shoulder 40 to allow the counterplate 36 to be stepped into place. The recess 50 terminates in the step 38 of the sleeve 20 which is important in locating the vertical spacing of the counterplate 36. The axial location of the counterplate 36 will define the gap between the counterplate 36 and thrust plate 30, forming an operative portion of the hydrodynamic bearing. Immediately below the counterplate 36 is located a shield 60 which is provided to close the bottom region of the bearing assembly, below the rotating shaft 24, from the outside working environment.

With respect to the lower thrust bearing which the thrust plate 30 is the primary component, this thrust plate is rotating in a recess defined by the sleeve surface 32 facing the upper side of the thrust plate, the sleeve recess 62 and recess defining surface 64 which extend along the outer diameter of the thrust plate, and the counterplate 36 captured in the shoulder 40 of the sleeve. The effective surfaces of the thrust bearing in maintaining the stability of the rotating system are the gap 70 between the upper surface of the thrust plate and the bottom shoulder 32 of the sleeve, and the gap 72 between the lower surface of the thrust plate and the upper surface of counterplate 36. The fluid will circulate through these gaps 70 and 72 and the reservoir 62, establishing and maintaining the axial force equilibrium which results form the thrust forces or lifts created in the gaps 70 and 72 and any external axial force applied to the rotating shaft 24 with respect to the sleeve 20.

In addition to the fluid present in the gaps between the rotating shaft 24 and sleeve 20, and between the thrust plate and sleeve and thrust plate and counterplate, fluid is also provided in a reservoir 80 incorporated into the center of the shaft 24, and communicating with the gap 22 between shaft 24 and sleeve 20 through a bore 82. Generally speaking, the direction of fluid flow through the hydrodynamic bearing will be from the reservoir 80 through the lower opening 84 of the reservoir and between the rotating shaft 24 and counterplate 36, through gap 72, reservoir 62 and gap 32 and through the gap 22 between rotating shaft 22 and sleeve 20. This fluid circulation with its accompanying definition of supporting pressure waves, is enhanced by herringbone patterns pressed, coined, or otherwise defined on the upper surface 32 and lower surface 34 of the thrust plate carried on the rotating shaft, as well as the chevron or herringbone style patterns known in this technology and carried on one of the surfaces of the rotating shaft 24 or sleeve 20 facing the defining gap 22.

The development of these pressure differentials is enhanced by the use of a herringbone pattern such as shown in FIG. 5 on one of the surfaces of either side of the gap 70 and 72 defined between the thrust plate and the surface it faces.

The fluid circulation and pressure differentials which maintain and enhance the stiffness of the hydrodynamic bearing are further created by the use of upper and lower journal bearings 90, 92 defined between the rotating shaft 24 and sleeve 20. Alternate embodiments with spiral grooves defined on the rotating shaft that is the outside surface of the rotating shaft 24 instead of on the internal bushing of the stationary sleeve are also available without significantly altering the behavior of the design.

The upper and lower internal bearings 90, 92 are separated by the bore 82 which communicates with reservoir 80 and ends in an equi-pressure groove 94. This groove is at the edge of the rotating shaft 24 adjacent the interior surface of sleeve 20. The upper and lower bearings 90, 92 are further defined by a herringbone pattern preferably comprising multiple (at least two) spiral groove axial sections pressed or otherwise defined into the surface of the sleeve 70. The geometry of this pattern is such as will be described further below that relative motion between the sleeve 20 and rotating shaft 24 surfaces will build up a positive pressure with respect to both ends of the bearing, thereby enhancing the desired fluid circulation through the bearing and maintaining the fluid within the bearing rather than allowing it to escape into the environment in which the hydrodynamic bearing is used.

The upper journal bearing 90 that is the bearing between the reservoir exit bore 82 and the rotating head cap portion 100 of the shaft 24 is also defined between the rotating outer surface of the rotating shaft 24 and the internal surface of sleeve 20. The bearing has a similar grooved pattern as described with respect to the lower journal bearing that is a herringbone pattern such that positive pressure is built up and established with respect to both ends of the bearing that is the end near to the reservoir exit bore 82, and the other end near to the upper tapered surface 102 of the outer sleeve 20.

As previously mentioned, the path of the circulation of the fluid past the journal bearing and thrust bearing includes equi-pressure groove 94 and radial bore 82, and a reservoir 80 which comprises a center bore in the rotating shaft, filled with lubricant. If gas bubbles or a void should appear in the fluid, they are likely to be trapped in this center bore due to the centrivical force differential between the heavier circulating fluid and the lighter bubble, thereby diminishing the prospect of a bubble or a void appearing in one of the thrust or journal bearings. Any such bubble or void can diminish the stiffness of the bearing, and lead to accelerated wear in the bearing. This feature is especially important during the assembly process, where it is used to fill and bleed the bearing properly, with the voids being bled out as they accumulate in the reservoir.

It should also be noted that the radial thrust plate gap or cavity 62 adjacent the end of the radial thrust plate 30 and define between that and in the interior wall 64 of sleeve 20 is also filled with lubricant. The cavity is large enough to enforce an infinite manifold boundary condition between the two thrust bearings defined in gaps 32, 34. The upper equi-pressure groove 94 and radial bore 82 connect the upper boundary of the lower journal bearing 92 and the lower boundary of the upper journal bearing 90 to the reservoir 80, thus enforcing an ambient pressure boundary condition. The circulating fluid thus can leave the journal bearing through the radial bore 82 and travel into the center bore reservoir 80 in order to maintain proper fluid circulation. A middle equi-pressure groove (not shown) may also be provided at the junction or intersection between the lower journal bearing 92 and the upper thrust bearing 32. This groove would fill with lubricant and would be large enough to enforce an infinite manifold boundary condition between the upper thrust bearing and lower journal bearing to further aide in the development of the proper pressure distribution across these surfaces.

The hydrodynamic bearing of the present invention further includes a capillary seal generally indicated at 110. It is formed at the radial gap between the rotating shaft 24 and the sleeve 20, the gap between these two facing surfaces of the two members having a progressively increasing width 102. The capillary action due to the surface tension in the bearing fluid prevents the fluid in the hydrodynamic bearing from spilling out of the bearing in a standstill condition.

The bearing further includes an enlarged recess 120 above the capillary seal 110 and defined between an upper shoulder 122 of the sleeve and a lower surface 124 of the rotating shaft. This gas trap 120 inhibits any net gas or fluid flow out of the bearing assembly to the atmosphere surrounding the assembly. However, gasses may still leave the fluid at the upper boundary of the upper journal bearing. Further, lubricant droplets created under excessive shock may also be defined to be collected in the same gas trap 170.

The ability to prevent exiting of particles or gasses from the hydrodynamic bearing is further enhanced by a seal 130 formed by the curved wall of the upper hub end of the rotating shaft rotating over the upright shoulder of the sleeve 20.

As a further protection against any escape of gas or the like, the lower surface 124 of the hub end of the shaft 24 and the horizontal surface 122 of the upper main body portion of the sleeve.

As a further protection, the surfaces 122, 124 of the gas trap reset may be colored with a non-wetting material to prevent fluid creep from the bearing into the gas trap. These coatings may also be applied to both the surfaces of the seal generally indicated at 130. The use of these barrier coatings may be significant because without them the seal may lose much of its sealing function, since evaporation from a wet surface will maximize in a narrow gap.

The other circumferential surface 140 of the gas trap, defined by an inner surface of the sleeve, may also be coated with holder ring of absorbent material on the surface thereof. This will eliminate condensing gasses and bind droplets accumulating in the gas trap 120.

Figure 3:
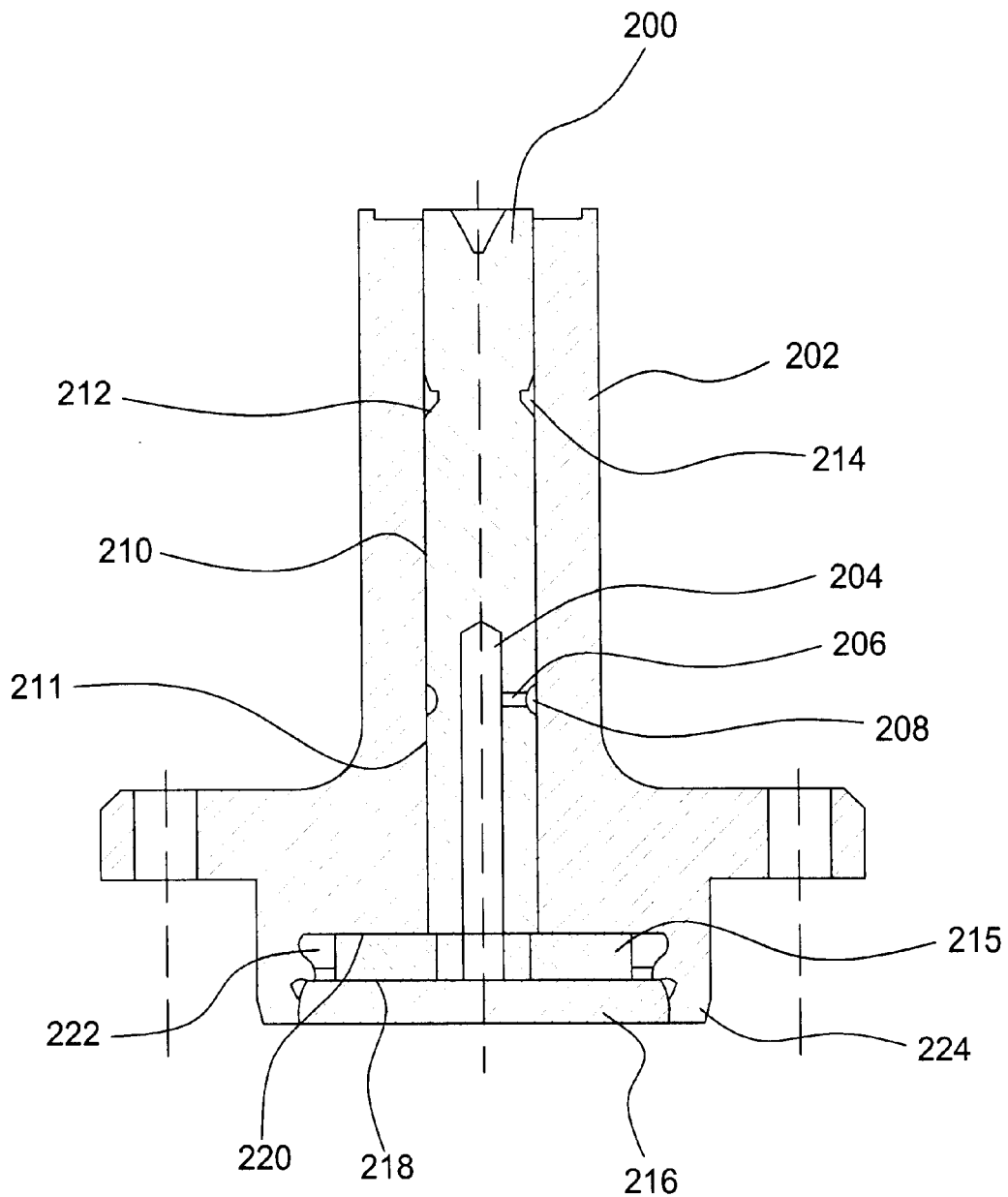
FIG. 3 is an alternative embodiment of a hydrodynamic bearing cartridge utilizing a rotating shaft.

A second rotating shaft hydrodynamic bearing is shown in FIG. 3. The hydrodynamic bearing of FIG. 3 also includes a rotating shaft 200 which in this embodiment is a straight stem rising up through a sleeve 202. The rotating shaft includes a fluid reservoir 204 connected through a bore 206 and equi-pressure groove 208 to the facing surfaces of the rotating shaft 200 in sleeve 202 which form the hydrodynamic journal bearings. In this embodiment, chevron patterns in the regions 210, 211 form journal bearings above and below the equi-pressure groove. The upper bearing to region 210 extends up to a region 211 where the surface of the rotating shaft angles away from the facing surface of the sleeve. A small shoulder 214 in the sleeve faces the notch 211 formed in the rotating shaft 200. This allows the formation of a capillary seal at the lower portion of the notch 211 extending from the rotating shaft across to the interior surface of the sleeve so that fluid cannot escape above this region.

The lower journal bearing 211 extends substantially down to a thrust plate 215 where the shaft terminates, with the reservoir 204 extending down through this thrust plate. As described in greater detail in the incorporated Leuthold et al. application, a counterplate 216 faces the bottom surface of the thrust plate 215. In a preferred embodiment, the chevron or herringbone patterns which are needed to establish the proper pressure distributions across the hydrodynamic bearing are formed on the upper surface 218 of this counterplate, facing the flat bottom surfaces of the thrust plate 215. Herringbone or chevron patterns are also formed on the upper surface 220 of the thrust plate facing the top surface of the recess 222 in which the thrust plate rotates so that both upper and lower thrust bearings are formed to enhance the lateral and axial stability of the rotating shaft in the hydrodynamic bearing. This arrangement incorporating a counterplate inserted between the shoulder 224 of the sleeve 202 forms a hydrodynamic bearing having a very flat bottom surface and a tall thin profile which has many potential uses.

Figure 4:
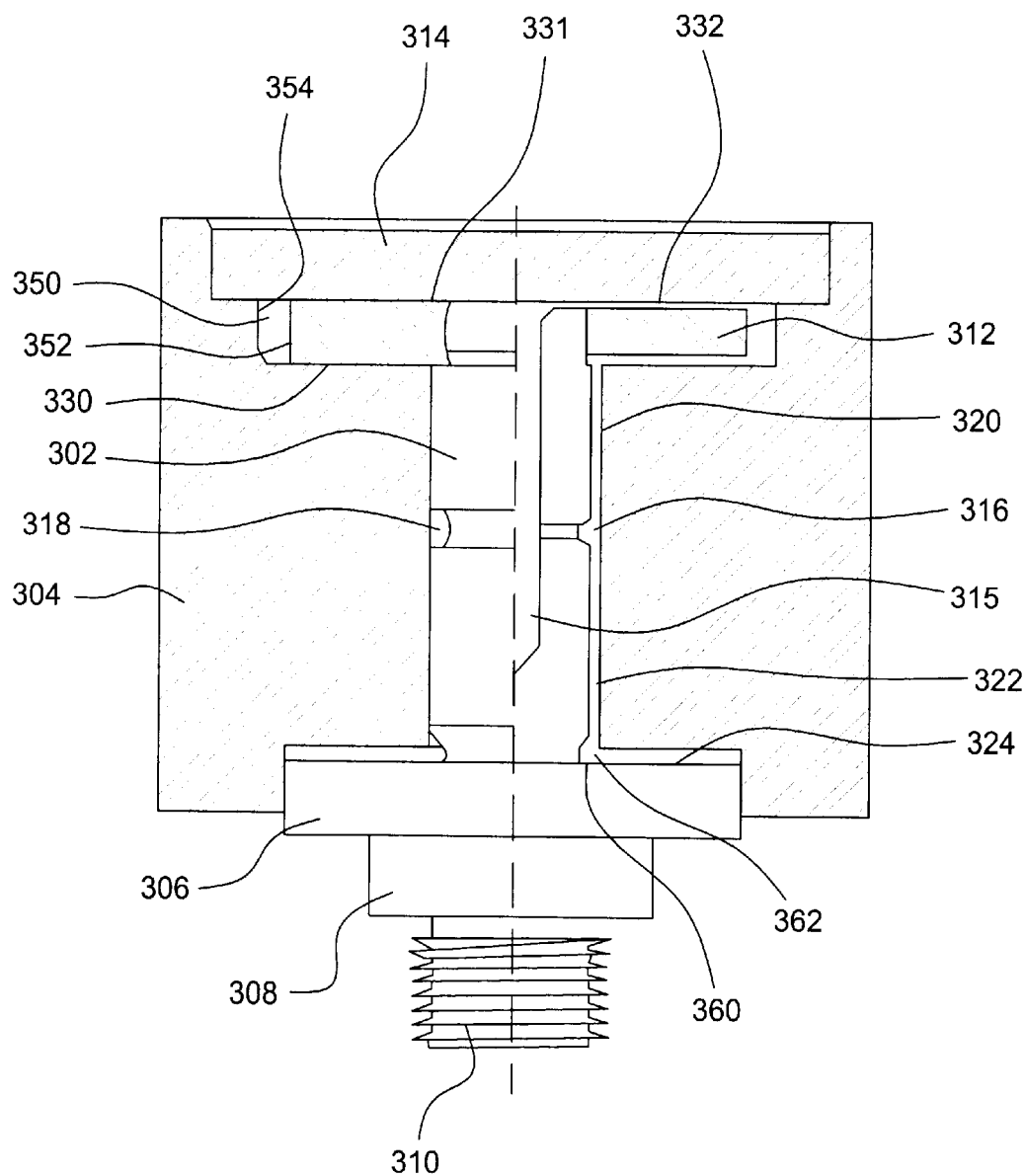
FIG. 4 is a vertical sectional view of a hydrodynamic bearing cartridge utilizing a fixed shaft.

FIG. 4 illustrates a hydrodynamic bearing cartridge incorporating a stationary shaft. The operating principles of the cartridge can be found in application of Leuthold et al., U.S. Ser. No. 08/278,754, filed Jul. 22, 1994 and incorporated herein by reference. Thus the bearing cartridge 300 includes a shaft 302 surrounded by a rotating sleeve 304. The shaft supports a first thrust plate 306 at one end, which in turn is supported by a shoulder 308 and nut 310. The shoulder and especially the nut are provided so that the fixed shaft bearing cartridge can be incorporated into any system in which the cartridge is to be used. The shaft includes an annular second thrust plate 312 at its opposite end. The sleeve 304 has up-raised shoulders, and a counterplate 314 is pressed and supported in place between the shoulders and rotates over the thrust plate 312. The fluid flow in the hydrodynamic bearing, in addition to being through the center reservoir 315 of the shaft and through the first radial bore 316 (and equalization for 318 flows out to upper and lower journal bearings 320, 322. These bearings are formed by chevron patterns and pressed either on the outer surface of the shaft 302 or inner surface of the rotating sleeve 304 in accordance with the principles discussed above. Further chevron or herringbone patterns are coined or impressed on the upper surface 324 of counterplate 306 so that fluid will also flow over this surface allowing the free rotation of the sleeve relative to the thrust plate while maintaining the stability of the system. At the opposite end of the fixed shaft, the first thrust plate surface 330 of thrust plate 312 which faces the sleeve 304 also has a herringbone pattern to create the desired pressure distribution over this first thrust bearing. On the opposite side of the thrust plate 312, is the second thrust plate surface 331 either the second thrust plate surface itself, or preferably the counterplate 314 will have on its surface 332 the desired herringbone pattern to create the pressure distributions in the second thrust bearing which are necessary to and characterize the bearing cartridge. The hydrodynamic bearing includes a radial thrust plate gap 350 defined between an outer end 352 of the thrust plate 312 and an inner surface 354 of the sleeve 304. The radial thrust plate gap 350 is wider than the gap defined between either the first thrust plate surface 330 and the sleeve 304 or the second thrust plate surface 331 and the counterplate 314. The radial thrust plate gap 350 can be filled with a lubricant to trap metal particles in the radial thrust plate gap 350 due to the centrifugal force differential between the circulating fluid and the metal particles.

FIG. 6 shows the basic elements of the hydrodynamic bearings of the present invention. The sleeve is a single solid piece 470 which on its interior surface 472 forms the bushing of the journal bearing. This bushing faces the shaft 452 which is rotating past the fixed bushing.

At the lower end of the rotating shaft near the base of the disc drive, a thrust plate 474 is stepped into the shaft at its upper end 476, and extends into a recess defined by the lower end of the bushing and the upper surface of counterplate 476. This counterplate 476 to the thrust plate 474 is preferably pressed in place against the lower portion 440 of the sleeve, or sits against a step in the bushing in order to fix its position.

It can be seen, referring to the counterplate 476, that a small recess 480 is provided in the lower inner portion of the stationary sleeve 470 to allow the counterplate 476 to be stepped into place. It should be noted that the location of this step 478 in the sleeve for locating the counterplate is important, as the axial location of the counterplate 476 will define the sum of the gaps in the lower thrust bearing for a given thrust plate 474 thickness.

Immediately below the counterplate 476 is located a shield 484 which is provided to close the bearing assembly from the outside. Obviously, although not shown herein, the lower outer portion of the sleeve could be inserted in the base casting of the disc drive in order to securely hold the entire spindle motor in a precise location and orientation. Returning to the lower thrust bearing, it is clear that since the thrust plate 474 is rotating in a recess 490 defined by the bushing 470 on its upperside, the sleeve 440 to the side, and the counterplate 476 at the lower end, these positions must all be securely fixed as tha gaps are very fine. The thrust bearing thus comprises the gap 492 between bushing 472 and thrust plate 474, the gap 494 and sleeve 440 and thrust plate 474, and the gap 496 between thrust plate 474 and counterplate 476, all defined by the axial force equilibrium resulting from thrust forces or lifts created in gaps 492 and 496 and any external axial force applied to the shaft with respect to the sleeve. Generally speaking, the direction of fluid flow through the bearing will be from the reservoir 400 through the lower equilibrium grove 404 and second radial bore 402, which is shown immediately adjacent the thrust plate 474 and the counterplate 476.

The fluid circulation is further created by use of upper and lower journal bearings defined between the rotating shaft 452 and the bushing 472 or sleeve 470. Alternate embodiments with spiral grooves defined on the shaft instead of on the bushings are possible without significantly altering the behavior of the design. The upper and lower journal bearings 430, 432 are seperated by equipressure groove 436 and first radial bore 434 in the rotating shaft 452 adjacent the bushing 472.

The hydrodynamic bearing of the present invention further includes a capillary seal generally indicated at 360. It is formed at the radial gap between the shaft 302 and the sleeve 304 at a first end of the journal bearing distal from the thrust plate, the gap between these two facing surfaces of the two members having a progressively increasing width 362. The capillary action due to the surface tension in the bearing fluid prevents the fluid in the hydrodynamic bearing from spilling out of the bearing in a standstill condition.

In all other respects the cartridge operates according to the same principles described above with respect to rotating shaft hydrodynamic bearing cartridges.

Other features and advantages of the present invention will become apparent to a person of skill in this field who studies the present invention disclosure. For example, the embodiments of both FIGS. 3 and 4 could be used as either rotating and stationary shaft motors. Therefore, the scope of the present invention is to be limited only by the following claims.

What is claimed is:

1. A hydrodynamic bearing cartridge comprising a sleeve and a shaft including a central reservoir, said shaft and said sleeve rotating freely relative to one another, and together defining a journal bearing gap, said shaft further supporting an annular thrust plate on an end thereof, said thrust plate extending into a recess formed by said sleeve and a counterplate supported from the sleeve, a surface of said thrust plate facing an axial surface of said sleeve, and a first surface of said counterplate facing an opposed surface of said thrust plate and cooperating therewith to define a fluid gap, one of the surfaces having a grooved pattern thereon to form an effective fluid pumping region in said hydrodynamic bearing, and fluid in the gap between the thrust plate and the counterplate, thrust plate and sleeve and the shaft and the sleeve wherein said shaft is stationary, and said sleeve supports a hub for rotation with said sleeve about said stationary shaft and is supported for rotation by a fluid dynamic bearing comprising an outer surface of said shaft and an inner surface of said sleeve, said first thrust plate surface cooperating with said recess surface of said sleeve and said first surface of said counterplate cooperating with said second surface of said thrust plate, and said first surface of said counterplate includes a grooved region which extends radially beyond the region overlying said second surface of said thrust plate.

2. A cartridge as claimed in claim 1 wherein said first surface of said counterplate is located between upright shoulders of said sleeve and located parallel to said thrust plate supported by said shaft.

3. A cartridge as claimed in claim 2 wherein said shaft terminates parallel to said second surface of annular thrust plate so that said first surface forms a planar end of said hydrodynamic bearing.

4. A hydrodynamic bearing cartridge comprising a sleeve and a shaft fitted into an axial bore of said sleeve, said shaft and said sleeve rotating freely relative to each other, said shaft defining together with said bushing a journal bearing defined by the gap between the shaft and the sleeve; said shaft further supporting an annular thrust plate on an end thereof, said thrust plate extending into a recess formed by a first radial face in said sleeve and a second radial face parallel to said thrust plate and defined on a counterplate supported from the sleeve, said first radial face defining together with the adjacent thrust plate surface a first thrust bearing, and the gap between said thrust plate and said second radial face forming a second thrust bearing; said shaft further comprising an axial reservoir for fluid for said fluid filled bearing system, said reservoir communicating with said hydrodynamic bearing.

5. A bearing cartridge as claimed in claim 4 having a first thrust plate surface fixed against a recessed step in said shaft so that the first thrust plate surface of the first thrust bearing is less than a second thrust plate surface of the second thrust bearing, whereby the net fluid flow established around said thrust plate is from said second thrust plate surface toward said first thrust plate surface and thereby toward an end of said journal bearing.

6. A bearing cartridge as claimed in claim 4 wherein a first end of said journal bearing distal from said annular thrust plate terminates in a capillary seal formed between said gap with said sleeve and said shaft.

7. A bearing cartridge as claimed in claim 6 wherein one of said surfaces of said sleeve and said shaft where said capillary seal is formed is inclined away from the other surface to aid in the formation of said capillary seal.

8. A bearing cartridge as claimed in claim 4 wherein said journal bearing is divided into upper and lower journal bearings, said upper and lower journal bearings having a pattern for creating a positive pressure differential from the boundaries towards a center of said journal bearing.

9. A bearing cartridge as claimed in claim 4 wherein said upper journal bearing has a greater net grooved surface directing fluid flow toward said first opening than the net grooved surface defined by said herringbone pattern directing fluid flow away from said opening.

* * * * *

UNITED STATES PATENT AND TRADEMARK OFFICE
CERTIFICATE OF CORRECTION

PATENT NO. : 6,702,408 B1
DATED : March 9, 2004
INVENTOR(S) : Lakshman Nagarathnam et al.

It is certified that error appears in the above-identified patent and that said Letters Patent is hereby corrected as shown below:

<u>Title page</u>,
Item [75], Inventors, replace "Gunther Heine" with -- Gunter Heine --.

Signed and Sealed this

Twenty-first Day of September, 2004

JON W. DUDAS
*Director of the United States Patent and Trademark Office*